US012536342B2

(12) United States Patent
Mondello et al.

(10) Patent No.: US 12,536,342 B2
(45) Date of Patent: Jan. 27, 2026

(54) SOC ARCHITECTURE WITH SECURE, SELECTIVE PERIPHERAL ENABLING/DISABLING

(71) Applicant: STMicroelectronics International N.V., Geneva (CH)

(72) Inventors: Antonino Mondello, Messina (FR); Michele Alessandro Carrano, Catania (IT); Riccardo Condorelli, Catania (IT)

(73) Assignee: STMicroelectronics International N.V., Geneva (CH)

(*) Notice: Subject to any disclaimer, the term of this patent is extended or adjusted under 35 U.S.C. 154(b) by 151 days.

(21) Appl. No.: 18/541,747

(22) Filed: Dec. 15, 2023

(65) Prior Publication Data

US 2024/0211643 A1 Jun. 27, 2024

(30) Foreign Application Priority Data

Dec. 23, 2022 (IT) .................. 102022000026793

(51) Int. Cl.
*G06F 21/85* (2013.01)
*G06F 21/60* (2013.01)
*G06F 21/79* (2013.01)

(52) U.S. Cl.
CPC ............ *G06F 21/85* (2013.01); *G06F 21/602* (2013.01); *G06F 21/79* (2013.01)

(58) Field of Classification Search
CPC ......... G06F 21/85; G06F 21/602; G06F 21/79
(Continued)

(56) References Cited

U.S. PATENT DOCUMENTS 8,887,144 B1 * 11/2014 Marr ................. G06F 9/4416
717/172
2005/0044368 A1 2/2005 Ahn et al.
(Continued)

FOREIGN PATENT DOCUMENTS

WO WO-2009017556 A1 * 2/2009 ............ G06F 21/85
WO WO-2011145095 A2 * 11/2011 ........... G06F 3/0227

OTHER PUBLICATIONS

Cheng et al., "A novel rewritable one-time-programming OTP (RW-OTP) realized by dielectric-fuse RRAM devices featuring ultra-high reliable retention and good endurance for embedded applications," 2018 (VLSI-TSA), Hsinchu, Taiwan, 2018, pp. 1-2, doi: 10.1109/VLSI-TSA.2018.8403852. (Year: 2018).*
(Continued)

*Primary Examiner* — Peter C Shaw
(74) *Attorney, Agent, or Firm* — Crowe & Dunlevy LLC

(57) ABSTRACT

A SOC includes a core, peripherals, and a bus for interconnecting the core and peripherals. Some peripherals can be selectively enabled or disabled on-demand. The SoC further includes peripheral enabling/disabling electronics and peripheral enabling/disabling circuitry coupled to the peripherals. The peripheral enabling/disabling electronics are directly connected to the peripheral enabling/disabling circuitry and are configured to store information items related to an enabled/disabled peripheral configuration, indicate the peripherals that are enabled and the peripherals that are disabled according to the enabled/disabled peripheral configuration, and provide the peripheral enabling/disabling circuitry with signals based on the stored information items. The peripheral enabling/disabling circuitry allows operation of the enabled peripherals and prevents operation of the disabled peripherals based on the signals received from the peripheral enabling/disabling electronics. The peripheral enabling/disabling electronics implement a secure mecha-
(Continued)

nism allowing access to the peripheral enabling/disabling electronics and modification of the stored information items if security criteria are met.

14 Claims, 8 Drawing Sheets

(58) Field of Classification Search
USPC .......................................................... 726/26
See application file for complete search history.

(56) References Cited

U.S. PATENT DOCUMENTS

| | | |
|---|---|---|
| 2006/0090084 A1 | 4/2006 | Buer |
| 2006/0230191 A1* | 10/2006 | Chang ................. G06F 13/4081 710/15 |
| 2016/0300064 A1* | 10/2016 | Stewart ............... G06F 12/0638 |
| 2021/0264065 A1 | 8/2021 | Barzic et al. |
| 2024/0078326 A1* | 3/2024 | Moran .................... G06F 21/53 |

OTHER PUBLICATIONS

Su et al., "Unveiling Security MRAM-OTP Macro using MTJ Hard Breakdown Mechanism," 2024 Asian Hardware Oriented Security and Trust Symposium (AsianHOST), Kobe, Japan, 2024, pp. 1-6, doi: 10.1109/AsianHOST63913.2024.10838477. (Year: 2024).*

Chung, "The Advances of OTP Memory for Embedded Applications in HKMG Generation and Beyond," 2019 IEEE 13th International Conference on ASIC (ASICON), Chongqing, China, 2019, pp. 1-4, doi: 10.1109/ASICON47005.2019.8983654. (Year: 2019).*

Hammi et al., "A Lightweight ECC-Based Authentication Scheme for Internet of Things (IOT)," in IEEE Systems Journal, vol. 14, No. 3, pp. 3440-3450, Sep. 2020, doi: 10.1109/JSYST.2020.2970167. (Year: 2020).*

IT Search Report and Written Opinion for priority application, IT Appl. 102022000026793, report dated Jul. 6, 2023, 8 pgs.

* cited by examiner

SOC ARCHITECTURE WITH SECURE, SELECTIVE PERIPHERAL ENABLING/DISABLING

PRIORITY CLAIM

This application claims the priority benefit of Italian Application for Patent No. 102022000026793 filed on Dec. 23, 2022, the content of which is hereby incorporated by reference in its entirety to the maximum extent allowable by law.

TECHNICAL FIELD

The present disclosure concerns an improved architecture for System-on-Chip (SoC) devices such as to allow secure, selective enabling/disabling of peripherals, interfaces, memories, hardware features, or the like.

BACKGROUND

As is known, a System on a Chip (or System-on-Chip—SoC) is an integrated circuit that integrates most or all components of a computer, or other electronic system, into a single chip or substrate. These components may typically include a microprocessor or core, a microcontroller, several peripherals, and interfaces (e.g., memory interfaces, input/output interfaces, secondary storage interfaces, etc.), often along with additional components/devices such as radio modems, radiofrequency (RF) signal processing electronics, a Graphics Processing Unit (GPU), or the like. As a result, a SoC may comprise digital, analog, mixed-signal, RF circuitry, etc.

SoC technology is typically exploited for embedded-type applications by virtue of extremely reduced size and high integration of this kind of integrated circuits.

Nowadays, the enabling/disabling of active peripherals of a SoC is performed according to customer request. The enabled/disabled peripheral configuration is hard-wired and defined during the design phase and is accomplished in a definitive way in the factory. Such a known solution is not flexible (in fact, the configuration is decided during the design phase and is carried out in a fixed manner during manufacturing) and does not allow any change of the enabled/disabled peripheral configuration by a user.

There is accordingly a need in the art to overcome the foregoing technical drawbacks and limitations.

SUMMARY

According to this disclosure, a System-on-Chip (SoC) device is provided with peripherals that can be selectively enabled or disabled on demand, and a related method for selectively enabling/disabling operation of peripherals of a SoC device is disclosed.

In greater detail, the SOC device includes: at least one core; a plurality of peripherals; at least one bus for interconnecting the at least one core and the plurality of peripherals, wherein the plurality of peripherals comprise a set of peripherals that can be selectively enabled or disabled on demand; and peripheral enabling/disabling electronics and peripheral enabling/disabling circuitry coupled to the plurality of peripherals, wherein the peripheral enabling/disabling electronics are directly connected to the peripheral enabling/disabling circuitry. The peripheral enabling/disabling electronics are configured to: store information items related to an enabled/disabled peripheral configuration and indicating the peripherals of the plurality of peripherals that are enabled and the peripherals of the plurality of peripherals that are disabled according to said enabled/disabled peripheral configuration; and provide the peripheral enabling/disabling circuitry with first signals based on the stored information items.

The peripheral enabling/disabling circuitry is configured to allow operation of the peripherals of the set of peripherals that are enabled and prevent operation of the peripherals of the plurality of peripherals that are disabled based on the first signals received from the peripheral enabling/disabling electronics. The peripheral enabling/disabling electronics are further configured to implement a secure mechanism allowing access to said peripheral enabling/disabling electronics and modification of the stored information items only if security criteria are met.

The peripheral enabling/disabling electronics may include a One Time Programmable memory configured to store the information items, and a plurality of registers. The plurality of registers may be configured to: be written/loaded with enabling/disabling data based on the stored information items; and provide the peripheral enabling/disabling circuitry with the first signals based the written/loaded enabling/disabling data and with a second signal indicating whether the first signals are valid or not.

The peripheral enabling/disabling circuitry may be configured to allow operation of the peripherals of the set of peripherals that are enabled and prevent operation of the peripherals of the plurality of peripherals that are disabled based on the first signals received from the plurality of registers if the second signal received from the plurality of registers indicates that the first signals are valid.

The peripheral enabling/disabling electronics may further include a security stub coupled to the One Time Programmable memory and configured to implement the secure mechanism allowing access to said One Time Programmable memory and modification of the stored information items if security criteria are met.

The security stub may be provided between the at least one bus or an interconnect of the system-on-chip device and the One Time Programmable memory, and may be configured to: receive a secure signal indicating whether the access to said One Time Programmable memory and the modification of the stored information items is allowed or not; and allow or block, based on the received secure signal, the access to the One Time Programmable memory and the modification of the stored information items via the at least one bus or the interconnect.

The at least one core may be configured to implement a secure firmware module configured to: provide the security stub with the secure signal; access the One Time Programmable memory via the at least one bus or the interconnect; carry out a modification of the stored information items; and manage the secure signal so that the security stub allows the access to the One Time Programmable memory and the modification of the stored information items.

The SOC device may include a user interface, and the at least one core may be configured to implement a peripheral enabling/disabling firmware module that is: operable to access the One Time Programmable memory via the at least one bus or the interconnect and to modify the stored information items; and configured to provide the security stub with the secure signal. The user interface may be configured to: allow a user to request a modification of the enabled/disabled peripheral configuration; and upon user request, provide the peripheral enabling/disabling firmware module with a corresponding command to modify the information items stored on the One Time Programmable memory. The peripheral enabling/disabling firmware module may be further configured to, upon receipt of the command from the user interface, access the One Time Programmable memory and modify the stored information items by managing the secure signal so that the security stub allows said access and said modification.

The peripheral enabling/disabling firmware module and the user interface may be configured to implement a cryptography technique in sending the command from said user interface to said peripheral enabling/disabling firmware module.

The plurality of registers may be persistent registers configured to be rewritten/reloaded with the enabling/disabling data after each power-up of the system-on-chip device.

The plurality of registers may be non-persistent registers configured to be rewritten/reloaded with the enabling/disabling data after each power-up and each standby of the system-on-chip device.

The plurality of registers may be directly connected to the One Time Programmable memory.

The plurality of registers may be connected to the One Time Programmable memory via an interconnect of the system-on-chip device, and a master unit may be provided in said system-on-chip device, the master unit being configured to manage reading of the information items from the One Time Programmable memory and writing/loading of the corresponding enabling/disabling data in/on the plurality of registers via the interconnect.

The method aspect disclosed herein is a method for selectively enabling/disabling operation of peripherals of a system-on-chip device that comprises a core, peripherals that can be selectively enabled or disabled on demand, at least one bus for interconnecting the core and the peripherals, peripheral enabling/disabling circuitry coupled to the peripherals, and peripheral enabling/disabling electronics directly connected to the peripheral enabling/disabling circuitry. The method may include: storing, on the peripheral enabling/disabling electronics, information items that are related to an enabled/disabled peripheral configuration and that indicate enabled and disabled peripherals according to said enabled/disabled peripheral configuration; providing the peripheral enabling/disabling electronics with a secure mechanism allowing access to said peripheral enabling/disabling electronics and modification of the stored information items if security criteria are met; operating the peripheral enabling/disabling electronics to provide the peripheral enabling/disabling circuitry with first signals based on the stored information items; and operating the peripheral enabling/disabling circuitry to allow operation of the enabled peripherals and to prevent operation of the disabled peripherals based on the first signals received by the peripheral enabling/disabling circuitry from the peripheral enabling/disabling electronics.

BRIEF DESCRIPTION OF THE DRAWINGS

For the understanding of the present disclosure, embodiments thereof will be described hereinafter, purely as non-limitative, non-binding examples, with reference to the enclosed drawings, wherein.

DETAILED DESCRIPTION

In the following, for the sake of description simplicity, the term "peripheral(s)" will be used to denote whatever peripheral, interface, hardware feature or device of a SoC having a bus interface connected to one of the internal buses (e.g., based on bus protocols AHB, AXI, OBI, APB, etc.) of the SoC, such as digital peripherals (e.g., cores, interfaces, crypto, encoder, decoder, etc.), memory controllers (e.g., SRAM, FLASH, OTP), analog peripherals (e.g., oscillators, pre-scaler, DC-DC, regulators, charge pump (if manageable with bus)), or the like. Accordingly, the term "peripheral(s)" is also used in the appended claims with the same above intended meaning.

Figure 1:
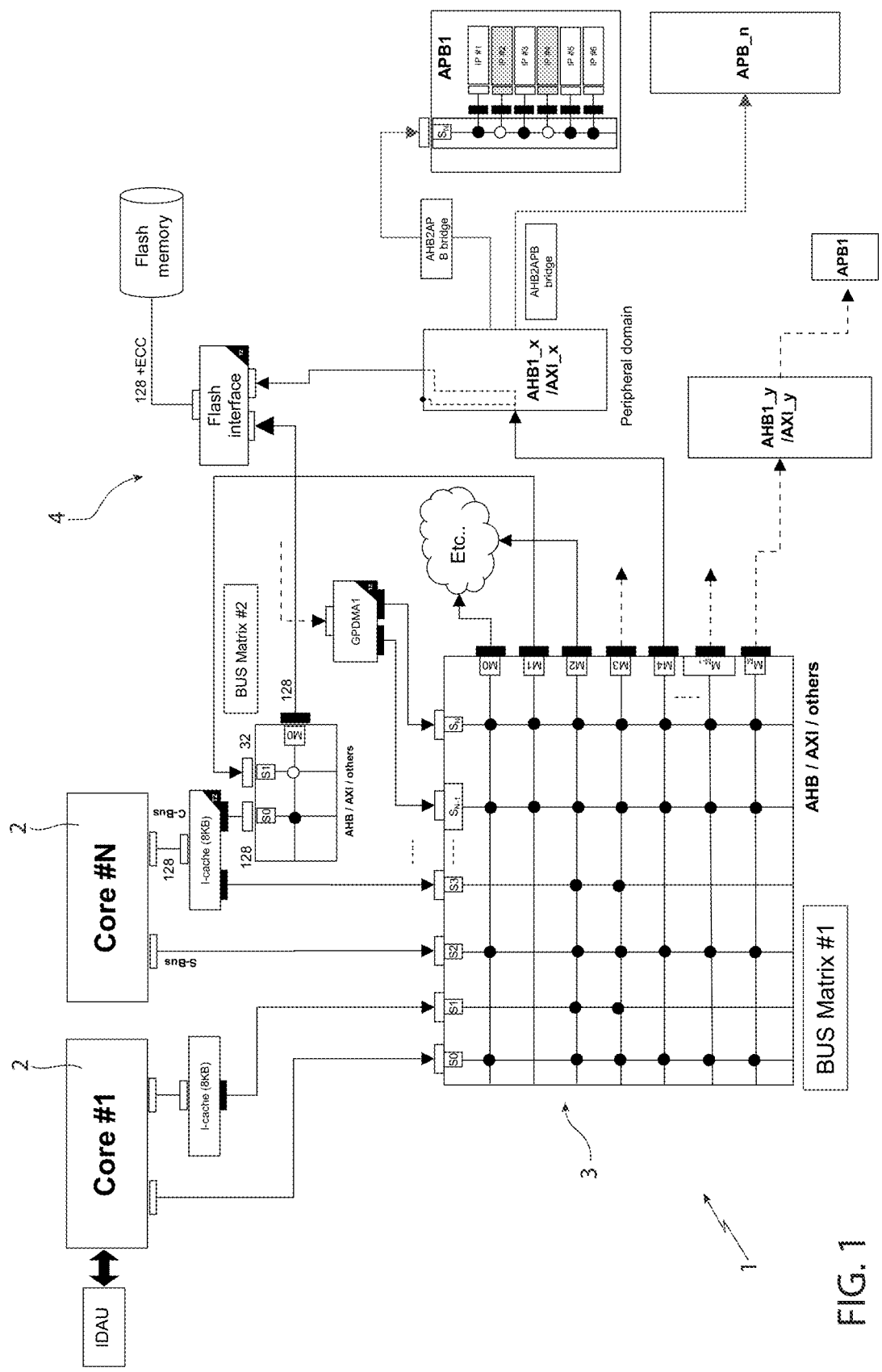
FIG. 1 schematically illustrates a typical multicore SoC architecture.

FIG. 1 schematically illustrates a typical multicore SoC architecture, whereby not all components thereof will be described hereinafter, whereas only those ones being relevant to description and comprehension of the present disclosure will be described. Accordingly, also reference numerals will be used only for those components being relevant to description and comprehension of the present disclosure.

In particular, the SoC shown in FIG. 1 (and therein denoted as a whole by 1) includes a plurality of cores 2 that are connected through at least one bus matrix 3 (e.g., based on bus protocols AHB, AXI, etc.) to several peripherals (denoted as a whole by 4) organized into domains and sub-domains.

Figure 2:
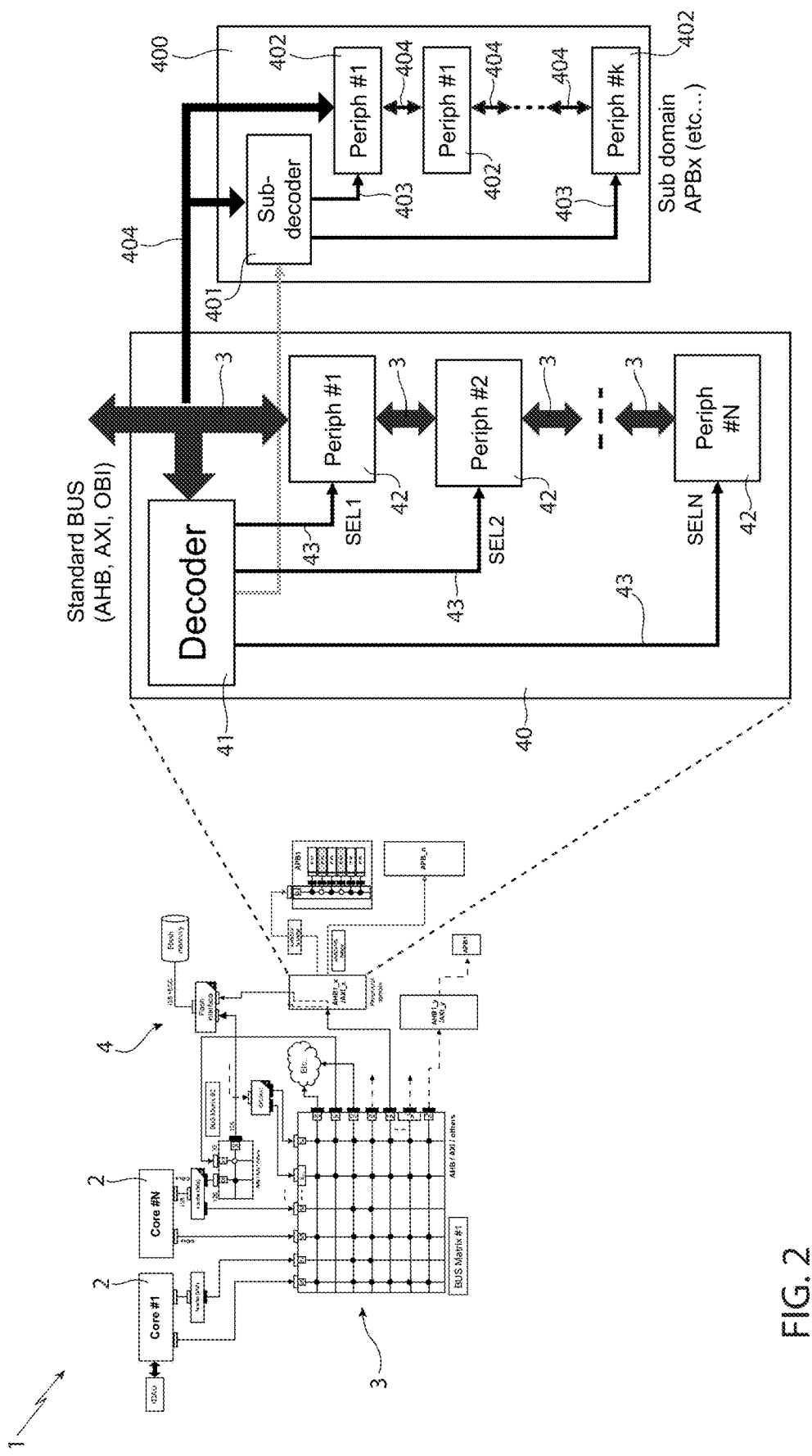
FIG. 2 schematically illustrates an architecture of a peripheral domain and a peripheral sub-domain of the SoC architecture shown in FIG. 1.

In this respect, for a better comprehension of peripheral domain/sub-domain concept, reference is made to FIG. 2 that schematically illustrates a more-detailed architecture of a peripheral domain and sub-domain shown in FIG. 1.

In particular, the peripheral domain shown in FIG. 2 (and therein denoted as a whole by 40) includes a decoder 41 coupled to a plurality of first peripherals 42, wherein said decoder 41 and said first peripherals 42 are connected to a main bus (e.g., based on bus protocol AHB, AXI, OBI, etc.) of the SoC 1, such as the bus matrix 3, and wherein the decoder 41 is operable to select (i.e., activate) the first peripherals 42, each via a respective selection wire 43.

Additionally, the decoder 41 is also operationally coupled to a peripheral sub-domain (denoted as a whole by 400) including a sub-decoder 401 that is coupled to, and is operable to select (i.e., activate), a plurality of second peripherals 402, each via a respective selection wire 403, wherein said sub-decoder 401 and said second peripherals 402 are interconnected to each other and connected to the bus matrix 3 via a secondary bus, or sub-bus, 404 (e.g., based on bus protocol APB or the like). The sub-decoder 401 could also include a protocol bridge if the peripheral domain 40 and the peripheral subdomain 400 work with different bus protocols (e.g., AHB and APB, respectively).

More in general, the peripherals belonging to one and the same peripheral domain (such as the first peripherals 42 belonging to the peripheral domain 40) share one and the same clock CLK, one and the same supply voltage $V_{dd}$, and one and the same bus protocol (e.g., AHB, AXI, OBI), whereas the peripherals belonging to one and the same peripheral sub-domain (such as the second peripherals 402 belonging to the peripheral sub-domain 400) share said one and the same clock CLK, said one and the same supply voltage $V_{dd}$, and one and the same sub-bus protocol (e.g., APB).

According to the present disclosure, a secure, selective peripheral enabling/disabling mechanism is integrated into the SoC 1 to allow selective enabling/disabling, on demand and/or on the field, of one or more peripherals, whereby the SoC 1 has a set of peripherals that can be enabled or disabled by the manufacturer or by a customer. During the design phase, it is possible to exclude some peripherals from those that can be enabled or disabled.

Figure 3:
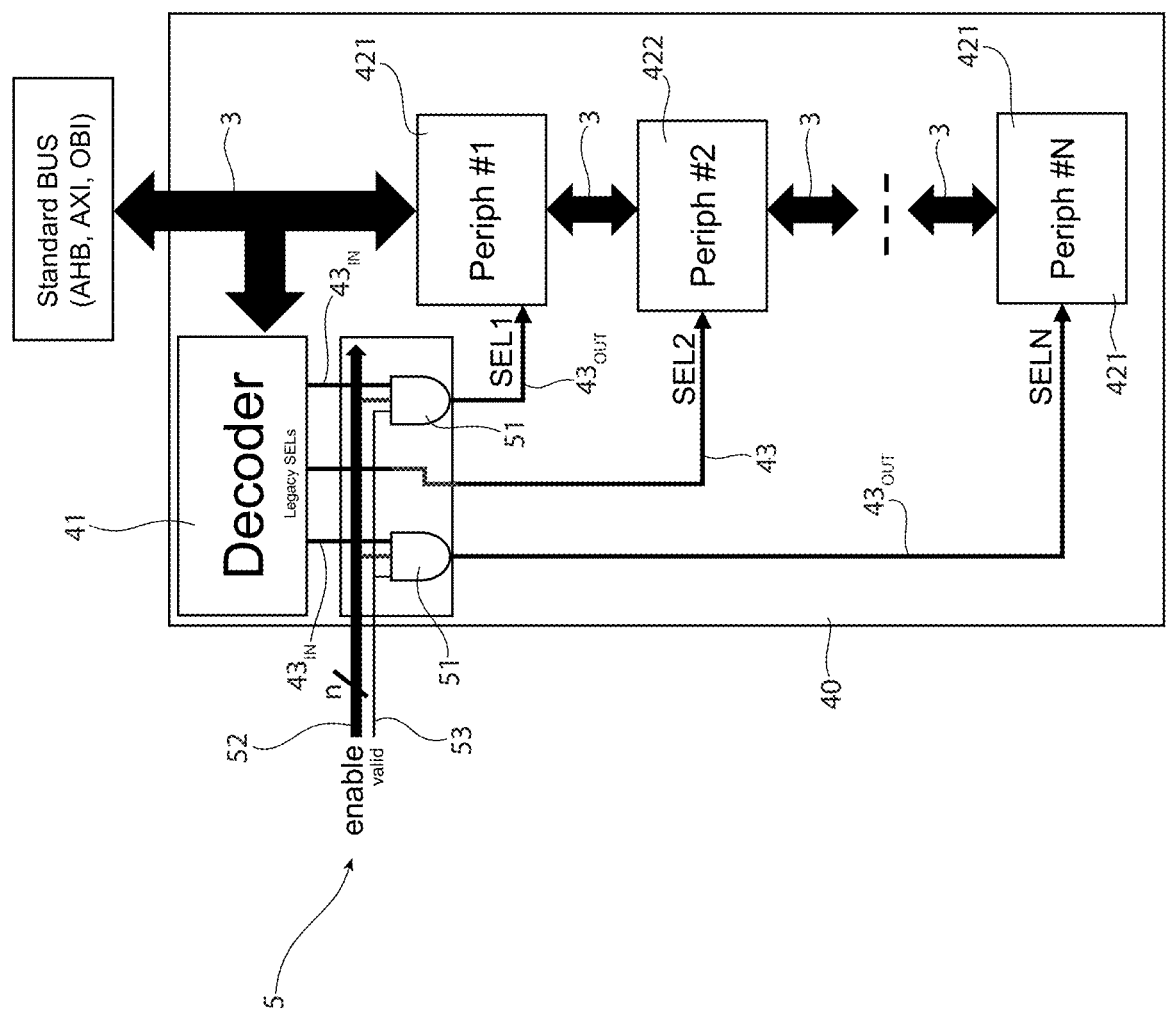
FIG. 3 schematically illustrates a peripheral enabling/disabling circuitry integrated into the peripheral domain/sub-domain architecture shown in FIG. 2 for implementing a secure, selective peripheral enabling/disabling mechanism.

In this connection, FIG. 3 schematically illustrates a peripheral enabling/disabling circuitry (denoted as a whole by 5) integrated into the peripheral domain 40 to carry out said secure, selective peripheral enabling/disabling mechanism, wherein said peripheral enabling/disabling circuitry 5 includes, for each of the first peripherals 42 that can be enabled or disabled (in FIG. 3 denoted by 421), a respective AND logic gate 51 that is configured to: receive, as inputs, a respective input selection signal from the decoder 41 via a respective input selection wire $43_{IN}$, a respective enable signal via a respective enable wire (in FIG. 3 and in the following ones, for the sake of illustration simplicity, only one enable wire 52 is shown) and a valid signal via a valid wire 53 common to all the AND logic gates 51; and provide the respective peripheral 421 with a respective output selection signal via a respective output selection wire $43_{OUT}$.

In other words, all the AND logic gates 51 receive, via one and the same valid wire 53, one and the same valid signal indicating whether the received enable signals are valid or not, and each AND logic gate 51 receives: via a respective enable wire 52, a respective enable signal for enabling/disabling the respective peripheral 421 and, via a respective input selection wire $43_{IN}$, a respective peripheral selection signal from the decoder 41 for operational selection (i.e., activation) of the respective peripheral 421.

In FIG. 3, also a peripheral 422 belonging to the first peripherals 42 is shown, which was excluded, during the design phase, from the secure, selective peripheral enabling/disabling mechanism, and that is, thence, directly connected, via a respective selection wire 43, to the decoder 41 to be directly selected (i.e., activated) thereby.

Said secure, selective peripheral enabling/disabling mechanism can be applied to all peripheral domains and sub-domains managed via standard buses.

Figure 4:
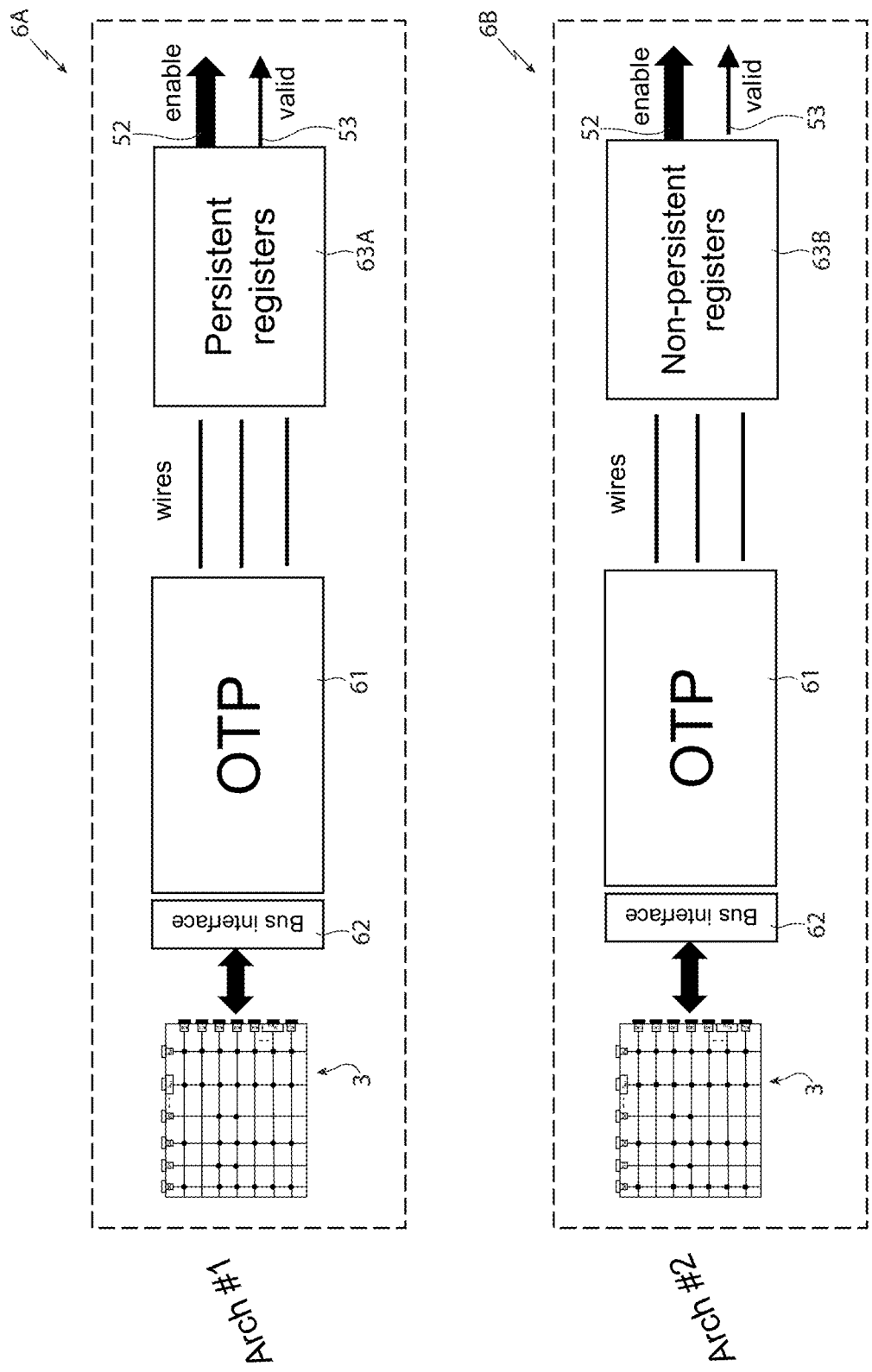
FIG. 4 schematically illustrates two architectures for peripheral enabling/disabling electronics for driving the peripheral enabling/disabling circuitry shown in FIG. 3.

FIG. 4 schematically illustrates a first architecture and a second architecture for peripheral enabling/disabling electronics integrated into the SoC 1 to provide the peripheral enabling/disabling circuitry 5 (namely, the AND logic gates 51) with the valid and enable signals.

According to both the architectures shown in FIG. 4, the peripheral enabling/disabling electronics (in the first and second architectures denoted as a whole by 6A and 6B, respectively) includes a One Time Programmable (OTP) memory 61 connected to the bus matrix 3 via a bus interface 62.

Moreover, in the first architecture, the peripheral enabling/disabling electronics 6A includes persistent registers 63A that are directly coupled/connected to the OTP memory 61 and supplied with a battery voltage $V_{batt}$ so that said persistent registers 63A retain loaded information during standby; instead, in the second architecture, the peripheral enabling/disabling electronics 6B include non-persistent registers 63B that are directly coupled/connected to the OTP memory 61 and supplied with a supply voltage $V_{dd}$ so that said non-persistent registers 63B have to be rewritten after standby. Outputs of the persistent/non-persistent registers 63A, 63B are directly connected, via the valid wire 53 and the enable wires 52, to the peripheral enabling/disabling circuitry 5 (namely, the AND logic gates 51) to provide the latter with the valid and enable signals.

The OTP memory 61 is programmable via the bus matrix 3 to permanently store information items related to a predefined enabled/disabled peripheral configuration of the SoC 1. Said OTP memory 61 is designed to function as an autonomous system that does not need any external intervention by a master unit.

When the SoC 1 is powered up, the information items stored on the OTP memory 61 are read and then loaded/written on/in the persistent/non-persistent registers 63A, 63B, which are configured to output the enable signals for driving the peripheral enabling/disabling circuitry 5 (namely, the AND logic gates 51) based on the predefined enabled/disabled peripheral configuration loaded on said persistent/non-persistent registers 63A, 63B. Additionally, in the second architecture, the information items related to the predefined enabled/disabled peripheral configuration have to be reloaded on the non-persistent registers 63B also after each standby.

Figure 5:
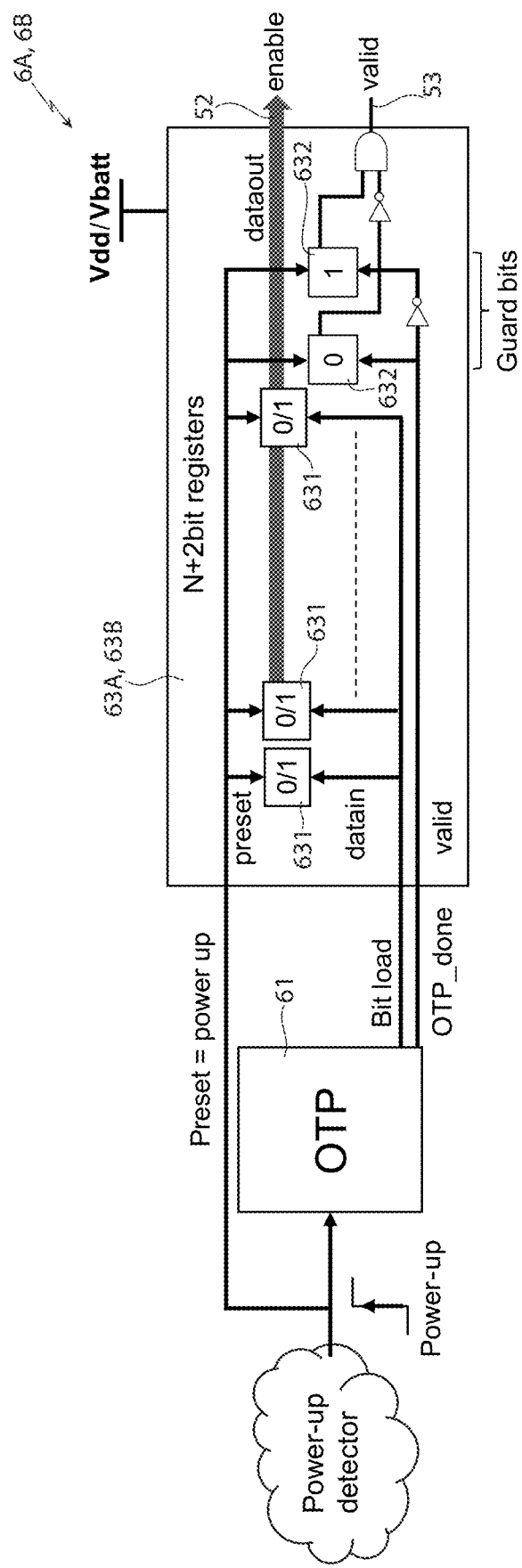
FIG. 5 schematically illustrates an exemplary embodiment of the peripheral enabling/disabling electronics having either of the two architectures shown in FIG. 4.

For example, as shown in FIG. 5, the persistent/non-persistent registers 63A, 63B may include N+2 binary registers 631, 632 for driving N AND logic gates 51 (with N being an integer higher than zero), wherein N binary registers 631 are intended to store, each, a respective enabling/disabling bit (e.g. 1 or 0) determining the value of a respective enable signal for enabling/disabling a respective peripheral 421, while the remaining two binary registers 632 are intended to store two guard bits determining the value of the valid signal indicating whether the enable signals are valid or not. These two guard bits are conveniently set as valid only when the reading of all the information items in the OTP memory 61 and the data loading/writing on/in the N binary registers are completed.

More in detail, at power-up: when a Power-up signal is rising, on the rising edge, all the N binary registers 631 are configured as disabled for security reasons, while the two guard bits are set as invalid; and the OTP content is read so that the N enabling/disabling bits are read and written in the N binary registers 631.

Once the reading of all the information items in the OTP memory 61 is successfully completed, the two guard bits are set as valid guard bit (e.g., as shown in FIG. 5, in response to an OTP_done signal rising), so that also the valid signal is properly set to indicate the validity of the enable signals.

In case of power loss, the content of the two binary registers 632 (i.e., the guard bits) is lost, and data become not valid.

The information items stored on the OTP memory 61 (and, hence, the corresponding predefined enabled/disabled peripheral configuration) can be modified by the manufacturer or a customer as explained hereinafter.

Figure 6:
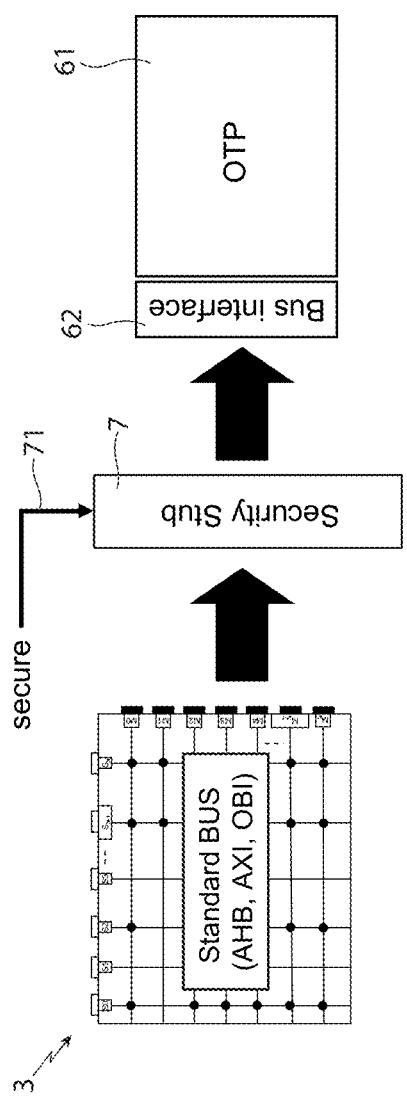
FIG. 6 schematically illustrates a secure mechanism for accessing an OTP memory of the peripheral enabling/disabling electronics having either of the two architectures shown in FIG. 4 in order to change/modify a predefined enabled/disabled peripheral configuration stored on the OTP memory.

FIG. 6 schematically illustrates a secure mechanism for accessing the OTP memory 61 in order to change/modify the predefined enabled/disabled peripheral configuration stored thereon, wherein a security stub 7 is provided between the bus matrix 3 and the OTP memory 61, which is configured to receive a secure signal via a secure wire 71 and to allow the access to the OTP memory 61 only if some predefined security criteria are met.

For example, assuming [add_low, add_high] to be a range of addresses of the OTP memory 61 at which the information items related to the predefined enabled/disabled peripheral configuration are stored, then: if the secure signal is set to zero and the access is requested (via the bus matrix 3) to an address within the address range [add_low, add_high], the security stub 7 refuses the access; otherwise (i.e., the secure signal is set to one or the requested address is outside the address range [add_low, add_high]), the security stub 7 allows the access.

Figure 7:
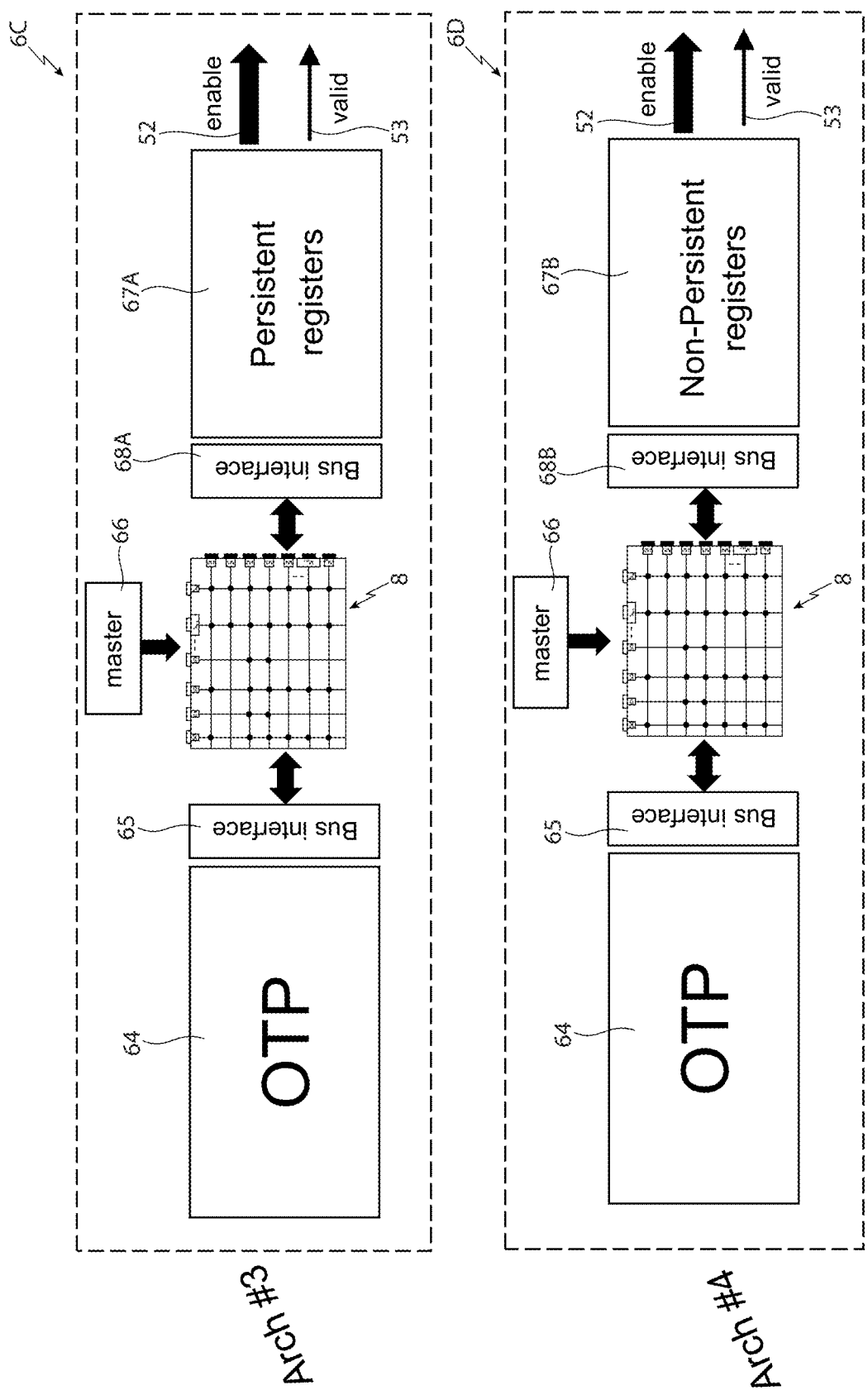
FIG. 7 schematically illustrates two additional architectures for the peripheral enabling/disabling electronics.

FIG. 7 schematically illustrates a third architecture and a fourth architecture for the peripheral enabling/disabling electronics.

Also in the architectures shown in FIG. 7, the peripheral enabling/disabling electronics (in the third and fourth architectures denoted as a whole by 6C and 6D, respectively) includes an OTP memory 64 connected to an interconnect bus 8 via a bus interface 65, wherein said OTP memory 64, differently from the OTP memory 61, is designed to be controlled by a master unit 66, such as one of the cores 2, or a dedicated electronic control unit integrated into the SoC 1, or an ad hoc control module implemented in one of the cores 2.

Moreover, in the third architecture, the peripheral enabling/disabling electronics 6C includes persistent registers 67A that are coupled/connected to the OTP memory 64 through the interconnect bus 8 via a respective bus interface 68A and supplied with the battery voltage $V_{batt}$ so that said persistent registers 67A retain loaded information during standby; instead, in the fourth architecture, the peripheral enabling/disabling electronics 6D includes non-persistent registers 67B that are coupled/connected to the OTP memory 64 through the interconnect bus 8 via a respective bus interface 68B and supplied with the supply voltage $V_{dd}$ so that said non-persistent registers 67B have to be reloaded after standby. Also the outputs of the persistent/non-persistent registers 67A, 67B are directly connected, via the valid wire 53 and the enable wires 52, to the peripheral enabling/disabling circuitry 5 (namely, the AND logic gates 51) to provide the latter with the valid and enable signals.

When the SoC 1 is powered up, the information items related to the predefined enabled/disabled peripheral configuration and stored on the OTP memory 64 are read by the master unit 66 and then loaded/written by the latter on/in the persistent/non-persistent registers 67A, 67B, which are configured to output the enable signals for driving the peripheral enabling/disabling circuitry 5 (namely, the AND logic gates 51) based on the predefined enabled/disabled peripheral configuration loaded on said persistent/non-persistent registers 67A, 67B. Moreover, in the fourth architecture, the information items related to the predefined enabled/disabled peripheral configuration have to be reloaded on the non-persistent registers 67B also after each standby.

Figure 8:
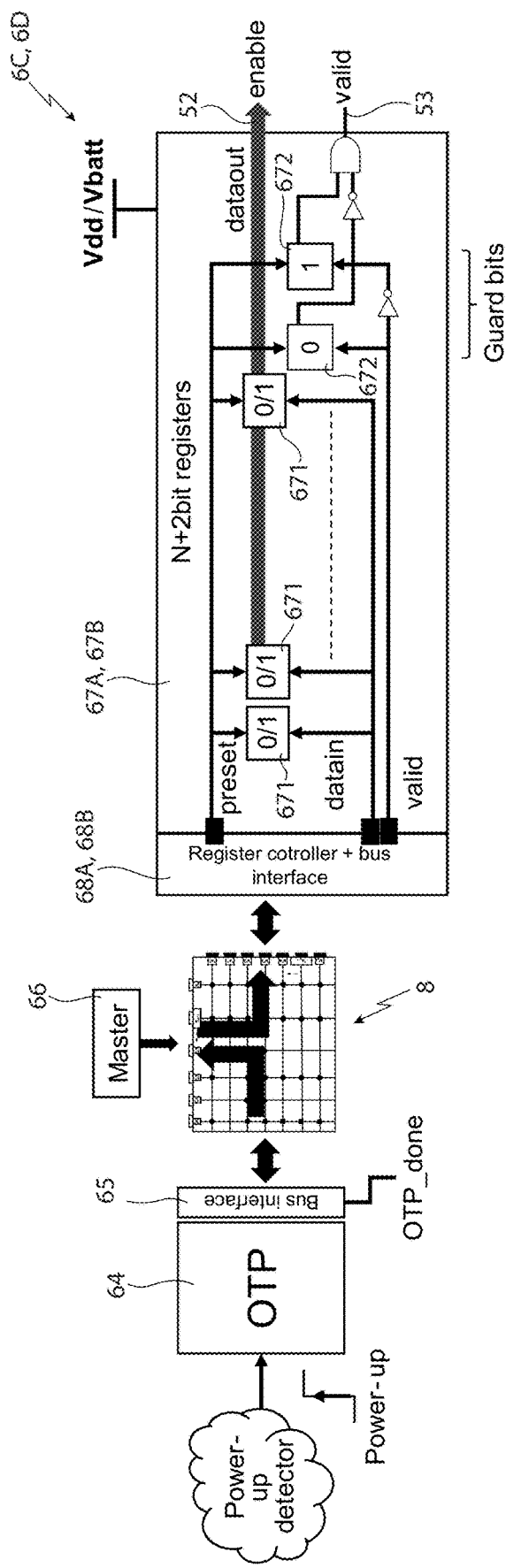
FIG. 8 schematically illustrates an exemplary embodiment of the peripheral enabling/disabling electronics having either of the two architectures shown in FIG. 7.

For example, as shown in FIG. 8, the persistent/non-persistent registers 67A, 67B may include N+2 binary registers 671, 672 for driving N AND logic gates 51 (with N being an integer higher than zero), wherein N binary registers 671 are intended to store, each, a respective enabling/disabling bit (e.g. 1 or 0) determining the value of a respective enable signal for enabling/disabling a respective peripheral 421, while the remaining two binary registers 672 are intended to store two guard bits determining the value of the valid signal indicating whether the enable signals are valid or not.

More in detail, at power-up: when a Power-up signal is rising, a controller of the persistent/non-persistent registers 67A, 67B (in FIG. 8 shown integrated with the respective bus interface 68A, 68B) pre-sets all the N binary registers 671 by configuring all the features as "safe" (i.e., "safe" means disabled or enabled depending on the feature managed with the i-th bit), and the two guard bits as invalid.

Meanwhile, the OTP memory 64 initializes all the features that leverages on it; once this task is completed, an OTP_done signal rises up to indicate that the OTP memory 64 is ready to be accessed by the master unit 66, and the guard bits are set as valid guard bit so that also the valid signal is properly set to indicate the validity of the enable signals once the OTP_done signal is equal to one, the master unit 66 accesses (in secure or protected mode) the data stored on the OTP memory 64 in order to initialize the N+2 binary registers; this access and register update are performed trough the interconnect bus 8.

The N bits stored in the binary registers 671 remain valid up to: in the third architecture involving the persistent registers 67A, the battery voltage $V_{batt}$ is available; or, in the fourth architecture involving the non-persistent registers 67B, the supply voltage $V_{dd}$ is available.

Anyway, at each power cycle, the N bits are reloaded according to the procedure previously described.

The information items stored on the OTP memory 64 (and, hence, the corresponding predefined enabled/disabled peripheral configuration) can be modified by the manufacturer or a customer as explained hereinafter.

Figure 9:
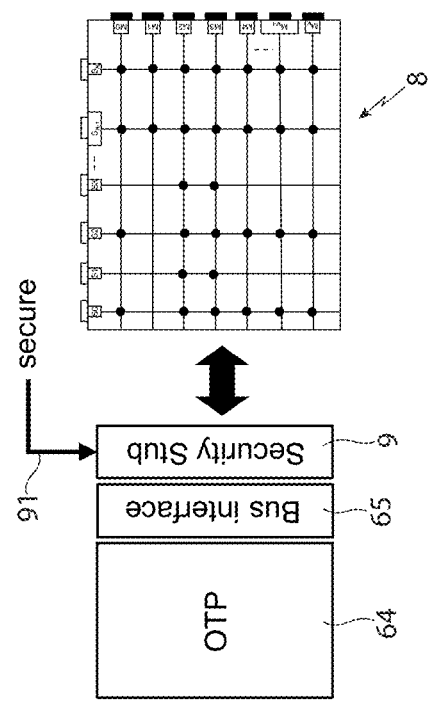
FIG. 9 schematically illustrates a secure mechanism for accessing an OTP memory of the peripheral enabling/disabling electronics having either of the two architectures shown in FIG. 7 in order to change/modify a predefined enabled/disabled peripheral configuration stored on the OTP memory.

FIG. 9 schematically illustrates a secure mechanism for accessing the OTP memory 64 in order to change/modify the predefined enabled/disabled peripheral configuration stored thereon, wherein a security stub 9 is provided between the interconnect bus 8 and the OTP memory 64 (more, specifically, between the interconnect bus 8 and the bus interface 65 of said OTP memory 64), wherein said security stub 9 is configured to receive a secure signal via a secure wire 91 and to allow the access to the OTP memory 64 only if some predefined security criteria are met.

As previously explained, in all the four architectures, the peripheral enabling/disabling electronics 6A, 6B, 6C, 6D are fitted with a security stub 7, 9 for controlling, in a secure way, the access to the OTP memory 61, 64 storing the predefined enabled/disabled peripheral configuration. In particular, a secure signal is used to selectively allow or disallow the access when the requested OTP address falls in said address range [add_low, add_high].

The generation of the secure signal for properly accessing the OTP memory 61, 64 and modifying the data/information items stored thereon can be managed mainly in two ways, namely: 1) by using a dedicated trusted/secure firmware (FW) module implemented in one of the cores 2; and/or 2) by implementing an authentication mechanism based on symmetric or asymmetric cryptography for authenticating commands received from a user via a user interface of the SoC 1.

As for the methodology 1), it is worth noting that, nowadays, it is common practice to provide SoC devices fitted with trusted/secure FW modules. Thence, a trusted/secure FW module implemented in one of the cores 2 of the SoC 1 can be properly configured/programmed to: manage the secure signal so as to access the OTP memory 61, 64; and configure the OTP memory 61, 64 so as to selectively enable/disable the peripherals 421.

For example, the trusted/secure FW module might be configured/programmed to: disable, for security reason, a specific peripheral after a certain number of times it has been used (e.g., a peripheral designed to be used only once, twice or, more in general, a certain number of times and then disabled); and/or enable a particular peripheral when one or more predefined conditions occur (e.g., a peripheral designed to be used only at the occurrence of a very specific operational situation).

Moreover, if the stored enabled/disabled peripheral configuration has to be changed, the trusted/secure FW module can be updated or a new version thereof can be installed on the SoC 1. For example, if a customer requests a peripheral configuration modification, the manufacturer may provide the customer with an update of, or a new version of, the trusted/secure FW module to be installed on the SoC 1.

As for the methodology 2), it is worth noting that the SoC devices are commonly provided with several standard user interfaces (SPI, USB, JTAG, debug, etc.). Therefore, a user (e.g., the manufacturer or a customer) may use a user interface of the SoC 1 to modify the stored enabled/disabled peripheral configuration. In this case, a dedicated peripheral enabling/disabling FW module implemented in one of the cores 2 of the SoC 1 is configured/programmed to: verify authenticity of the peripheral configuration modification commands received from the user via the user interface; and, if the commands are authenticated, manage the secure signal so as to access the OTP memory 61, 64, and configure the OTP memory 61, 64 so as to selectively enable/disable the peripherals 421 according to the received commands.

The authentication can be based on symmetric and/or asymmetric cryptography.

For example, with reference to symmetric cryptography, symmetric encryption/decryption (e.g., AES or the like) can be used: 1) a user encrypts a peripheral enable/disable message by using a secret key known to both the user and the dedicated peripheral enabling/disabling FW module of the SoC 1; 2) the dedicated peripheral enabling/disabling FW module decrypts the received message by using the secret key and, then, implements the peripheral enable/disable command received.

In order to avoid any replay attack, the peripheral enable/disable message is completed with a freshness (e.g., monotonic counter, timestamp, etc.).

In particular, if a monotonic counter is used, the received counter value must be higher than the last one used, otherwise a replay attack is detected.

Instead, if a timestamp is used, the time distance between two consecutive timestamps must not exceed a predefined threshold.

Again with reference to symmetric cryptography, a signature (e.g., SHA256, MD5, etc.) can be also used: 1) the user sends a plaintext peripheral enable/disable message (again with freshness), wherein said plaintext peripheral enable/disable message is signed with a signature computed based on a secret key known to both the user and the dedicated peripheral enabling/disabling FW module; whereby the plaintext peripheral enable/disable message+freshness+signature are sent to the dedicated peripheral enabling/disabling FW module via a user interface of the SoC 1; 2) the dedicated peripheral enabling/disabling FW module receives the plaintext peripheral enable/disable message+freshness+signature and verifies the signature by computing it again and, then, by comparing the computed signature with that one sent by the user; if the verification is successful, the dedicated peripheral enabling/disabling FW module implements the peripheral enable/disable command received.

With reference to asymmetric cryptography, asymmetric encryption/decryption (e.g., RSA or the like) can be used: 1) the user encrypts the peripheral enable/disable message by using the public key of the dedicated peripheral enabling/disabling FW module; 2) the dedicated peripheral enabling/disabling FW module decrypts the received message by using its secret key and, if the decryption is successful, implements the peripheral enable/disable command received.

Also in this case, in order to avoid any replay attack, the peripheral enable/disable message is completed with a freshness (e.g., monotonic counter, timestamp, etc.) according to the same implementation logic previously described.

Again with reference to asymmetric cryptography, a signature (e.g., ECDSA or the like) can be also used: 1) the user sends a plaintext peripheral enable/disable message (again with freshness), wherein said plaintext peripheral enable/disable message is signed with a signature computed based on his/her secret key; whereby the plaintext peripheral enable/disable message+freshness+signature are sent to the dedicated peripheral enabling/disabling FW module via the user interface; 2) the dedicated peripheral enabling/disabling FW module receives the plaintext peripheral enable/disable message+freshness+signature and verifies the signature based on the public key of the user; if the verification is successful, the dedicated peripheral enabling/disabling FW module implements the peripheral enable/disable command received.

Mixed approaches based on both methodologies 1) and 2), and/or on both symmetric and asymmetric cryptography, can be also implemented.

From the foregoing, the technical advantages and the innovative features of the present device are immediately clear to those skilled in the art.

In particular, the present disclosure allows, on manufacturer's side, to: optimize the production by unifying some product lines with a resulting cost saving; avoid test-mode unlock to rework dice, wherein the rework could happen also on field; and create a new business model by applying a pay-per-use strategy for peripheral/feature enabling/disabling.

Additionally, on customer's side, it is possible to: request new peripheral licenses; achieve flexibility in implementation of new features by adding some new peripherals (under manufacturer's license); and disable/enable licensed peripherals when not used (for example, in order to avoid hacker attacks).

The device allows achieving high flexibility in product definition with many opportunities for manufacturers and customers.

In fact, in the factory: only "few" product line with several peripherals on board can be produced, wherein said product lines can be enabled/customized in a secure way only upon customer's request; only the peripheral requested by each customer are enabled (i.e., only those ones paid by the customer); the frequency range of some peripherals can be enabled (speed class selection and consumption); and all the devices present in a warehouse can be reworked in order to enable only the peripherals needed in case of sudden request from market. For this operation, no test mode access is needed (so, if the devices are locked, it is not necessary to unlock them for reconfiguration), because everything is based on cryptographic methods.

Moreover, in the field: a customer can request the manufacturer to enable new peripherals (pay per use) on the devices already soldered on a board; so, the manufacturer provides some keys that allow the customer to enable the new peripherals needed for new services; a customer can manage in a secure way the peripherals already licensed, disabling/enabling some of them in particular scenarios, for example: in case of detection of a hacker attack, the customer may block (disable) the usage of some peripherals; the customer can disable some sensitive memory modules when not needed; then, the customer can enable them again only when needed (power optimization, reduced hacking risk); and the customer can disable some interfaces (e.g., debug, etc.) when not needed; then, the customer can enable them again only when needed (power optimization, reduced hacking risk).

In conclusion, it is clear that numerous modifications may be made to the device described and illustrated herein, all falling within the scope of the invention as defined in the attached claims. For example, the various embodiments described above can be combined to provide further embodiments.

The invention claimed is:

1. A system-on-chip device, comprising:
at least one core;
a plurality of peripherals;
at least one bus for interconnecting the at least one core and the plurality of peripherals, wherein the plurality of peripherals comprise a set of peripherals that can be selectively enabled or disabled on demand; and
peripheral enabling/disabling electronics and peripheral enabling/disabling circuitry coupled to the plurality of peripherals, wherein the peripheral enabling/disabling electronics are directly connected to the peripheral enabling/disabling circuitry and are configured to:
  store information items related to an enabled/disabled peripheral configuration and indicating the peripherals of the plurality of peripherals that are enabled and the peripherals of the plurality of peripherals that are disabled according to said enabled/disabled peripheral configuration; and
  provide the peripheral enabling/disabling circuitry with first signals based on the stored information items;
wherein the peripheral enabling/disabling circuitry is configured to allow operation of the peripherals of the set of peripherals that are enabled and prevent operation of the peripherals of the plurality of peripherals that are disabled based on the first signals received from the peripheral enabling/disabling electronics; and
wherein the peripheral enabling/disabling electronics includes a One Time Programmable memory coupled to a security stub, wherein the One Time Programmable memory stores the information items and the security stub allows modification of the stored information items in the One Time Programmable memory if security criteria are met.

2. The system-on-chip device of claim 1, wherein the peripheral enabling/disabling electronics include the One Time Programmable memory and a plurality of registers that are configured to:
be written/loaded with enabling/disabling data based on the stored information items; and
provide the peripheral enabling/disabling circuitry with the first signals based the written/loaded enabling/disabling data and with a second signal indicating whether the first signals are valid or not;
wherein the peripheral enabling/disabling circuitry is configured to allow operation of the peripherals of the set of peripherals that are enabled and prevent operation of the peripherals of the plurality of peripherals that are disabled based on the first signals received from the plurality of registers if the second signal received from the plurality of registers indicates that the first signals are valid.

3. The system-on-chip device of claim 2, wherein the security stub is provided between the at least one bus or an interconnect of the system-on-chip device and the One Time Programmable memory, and is configured to:
receive a secure signal indicating whether access to said One Time Programmable memory and the modification of the stored information items is allowed or not; and
allow or block, based on the received secure signal, the access to the One Time Programmable memory and the modification of the stored information items via the at least one bus or the interconnect.

4. The system-on-chip device of claim 3, wherein the at least one core is configured to implement a secure firmware module configured to:
provide the security stub with the secure signal;
access the One Time Programmable memory via the at least one bus or the interconnect;
carry out a modification of the stored information items; and
manage the secure signal so that the security stub allows the access to the One Time Programmable memory and the modification of the stored information items.

5. The system-on-chip device according to claim 3, further comprising a user interface;
wherein the at least one core is configured to implement a peripheral enabling/disabling firmware module that is:
  operable to access the One Time Programmable memory via the at least one bus or the interconnect and to modify the stored information items; and
  configured to provide the security stub with the secure signal;
wherein the user interface is configured to:
  allow a user to request a modification of the enabled/disabled peripheral configuration; and
  upon user request, provide the peripheral enabling/disabling firmware module with a corresponding command to modify the information items stored on the One Time Programmable memory; and
wherein the peripheral enabling/disabling firmware module is further configured to, upon receipt of the command from the user interface, access the One Time Programmable memory and modify the stored information items by managing the secure signal so that the security stub allows said access and said modification.

6. The system-on-chip device of claim 5, wherein the peripheral enabling/disabling firmware module and the user interface are configured to implement a cryptography technique in sending the command from said user interface to said peripheral enabling/disabling firmware module.

7. The system-on-chip device according to claim 2, wherein the plurality of registers are persistent registers configured to be rewritten/reloaded with the enabling/disabling data after each power-up of the system-on-chip device.

8. The system-on-chip device according to claim 2, wherein the plurality of registers are non-persistent registers configured to be rewritten/reloaded with the enabling/disabling data after each power-up and each standby of the system-on-chip device.

9. The system-on-chip device according to claim 2, wherein the plurality of registers are directly connected to the One Time Programmable memory.

10. The system-on-chip device according to claim 2, wherein the plurality of registers are connected to the One Time Programmable memory via an interconnect of the system-on-chip device, and wherein a master unit is provided in said system-on-chip device, the master unit being configured to manage reading of the information items from the One Time Programmable memory and writing/loading of the corresponding enabling/disabling data in/on the plurality of registers via the interconnect.

11. A method for selectively enabling/disabling operation of peripherals of a system-on-chip device that comprises a core, peripherals that can be selectively enabled or disabled on demand, at least one bus for interconnecting the core and the peripherals, peripheral enabling/disabling circuitry coupled to the peripherals, and peripheral enabling/disabling electronics directly connected to the peripheral enabling/disabling circuitry, the method comprising:
    storing, on the peripheral enabling/disabling electronics, information items that are related to an enabled/disabled peripheral configuration and that indicate enabled and disabled peripherals according to said enabled/disabled peripheral configuration;
    operating the peripheral enabling/disabling electronics to provide the peripheral enabling/disabling circuitry with first signals based on the stored information items; and
    operating the peripheral enabling/disabling circuitry to allow operation of the enabled peripherals and to prevent operation of the disabled peripherals based on the first signals received by the peripheral enabling/disabling circuitry from the peripheral enabling/disabling electronics
    providing the peripheral enabling/disabling electronics with a One Time Programmable (OTP) memory coupled to a security stub, wherein the OTP memory stores the information items and the security stub allows modification of the stored information items in the OTP memory if security criteria are met.

12. The method of claim 11, further comprising:
    storing enabling/disabling data in registers;
    providing the peripheral enabling/disabling circuitry with the first signals based the stored enabling/disabling data and with a second signal indicating whether the first signals are valid;
    allowing operation of the peripherals of the system-on-chip device that are enabled and preventing operation of the peripherals of the system-on-chip device that are disabled based on the first signals received from the registers if the second signal received from the registers indicates that the first signals are valid.

13. The method of claim 12, further comprising, at the security stub:
    receiving a secure signal indicating whether access to said OTP memory and the modification of the stored information items is allowed or not; and
    allow or block, based on the received secure signal, the access to the OTP memory and the modification of the stored information items via the at least one bus.

14. The method of claim 13, further comprising, at the core, implementing a secure firmware module configured to:
    provide the security stub with the secure signal;
    access the OTP memory via the at least one bus or the interconnect;
    carry out a modification of the stored information items; and
    manage the secure signal so that the security stub allows the access to the OTP memory and the modification of the stored information items.

* * * * *